Feb. 18, 1958     W. S. BUNNELL     2,823,762
DUST COLLECTOR

Filed March 24, 1954     4 Sheets-Sheet 1

Inventor,
William S. Bunnell
By: Morris Spector
Atty.

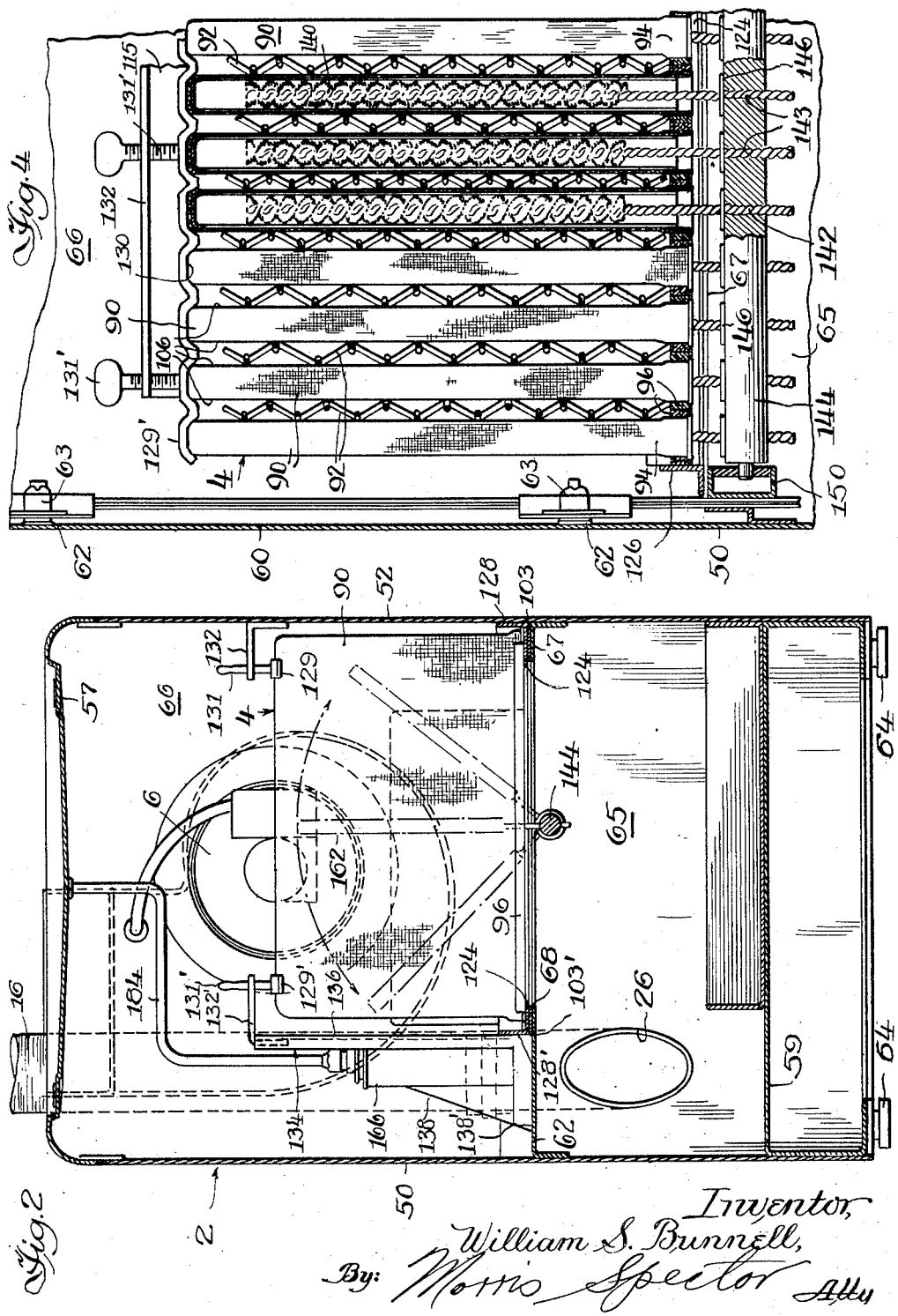

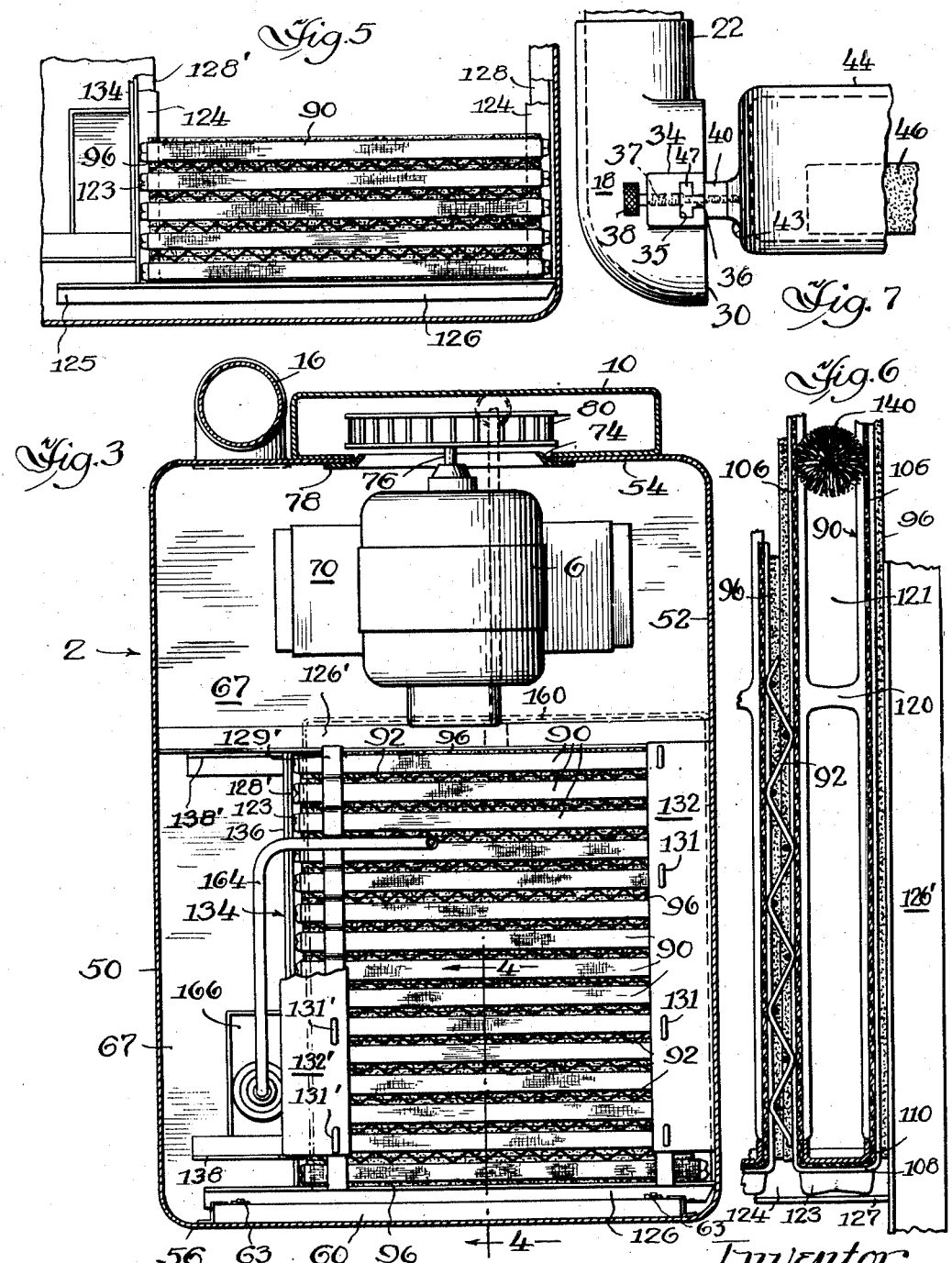

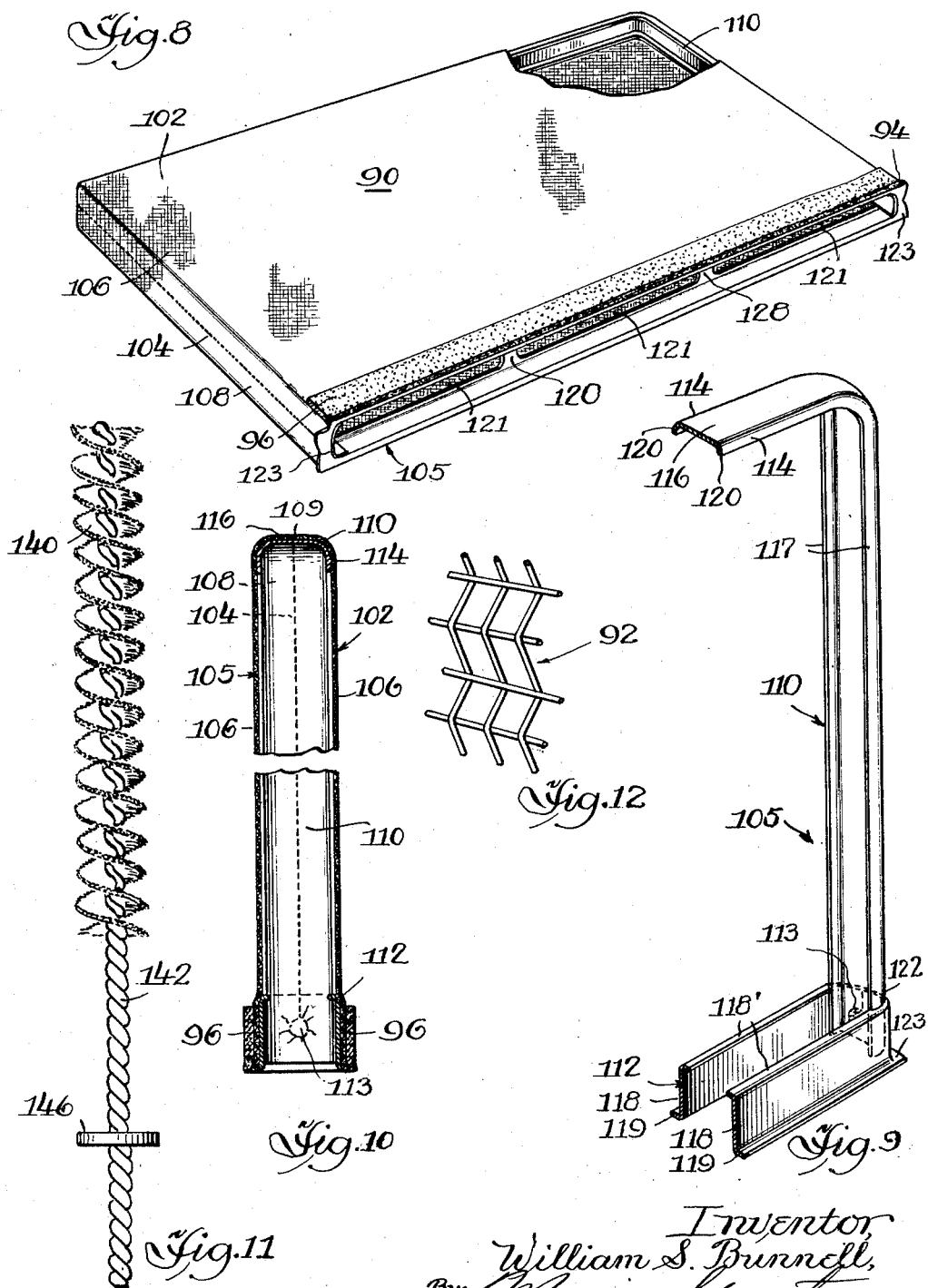

United States Patent Office 2,823,762
Patented Feb. 18, 1958

2,823,762

DUST COLLECTOR

William S. Bunnell, Chicago, Ill., assignor to Boyar-Schultz Corporation, Chicago, Ill., a corporation of Illinois Application March 24, 1954, Serial No. 418,297

3 Claims. (Cl. 183—60)

This invention relates to machine tools and more particularly to tools embodying grinding or abrading actions or similar actions that produce objectionable amounts of dust.

It is an object of the present invention to provide a dust collector which collects and thereby prevents the spreading of dust produced by machine tools of the above-mentioned character. Dust collecting apparatus of type with which the present invention is concerned generally includes means for drawing the dust-laden air through one or more air-filtering dust-collecting bags. As the dust accumulates within a bag it tends to clog the bag and interfere with the movement of air therethrough. It therefore becomes necessary to clean or replace the bag periodically, as is well known in the art. The present invention is primarily concerned with machines of the above-mentioned character wherein the bags are cleaned while they remain assembled in the machine. It is one of the objects of the present invention to provide means that can readily be operated from time to time to remove most if not all of the accumulated dust from the surface of the dust-collecting bag and thereby restore the dust-collecting capacity of the bag. The preferred manner of accomplishing this result, as exemplified in the embodiment of the present invention illustrated in the drawings of this application, is to provide a mechanically actuated brush so arranged that by a simple actuation thereof it sweeps or brushes the accumulated dust from the filter bag while the filter bag remains assembled in the machine.

It is a further object of the present invention to provide a flexible filter bag assembly comprising a number of filter bags so arranged and mounted that they maintain their shape without interference with one another.

It is a further object of the present invention to provide a filter bag assembly for a dust collector wherein each bag of the assembly is separately removable from the assembly without substantially disturbing the other bags thereof and wherein each bag when positioned in the assembly makes a proper sealing engagement with adjacent bags.

Briefly, the novel filter bag assembly of the embodiment of the invention herein illustrated includes a number of separate, open-bottomed filter bags which are in side-by-side relation and, except for the facing bottom portions of the bag, are in spaced relation to define exit passageways for the flow of filtered air leaving the bags. The facing bottom portions of the bags make sealing engagement so that all of the dust-laden air flowing into the dust collector enters the open bottoms of the bags.

It is a further object of the present invention to provide means between adjacent, spaced filtering walls of the bag assembly to prevent those adjacent walls from being drawn into contact with one another by the pressure differentials that exist on opposite sides of the respective walls. This is accomplished by interposing a corrugated, rubber covered, wire spacing frame between such adjacent filter walls for maintaining them out of contact with one another. The rubber covering on the spacing member prevents the spacing member from tearing or wearing away the filter bags.

In accordance with one of the principles of the present invention a number of brushes are mounted on a common rock shaft that extends outside of the machine and has a handle thereon whereby the shaft, and thereby the brushes, may be rocked over a limited angle. Each one of these brushes, when actuated, moves across the dust-collecting surface of a filter bag. These brushes move in a vertical plane so that any dust loosened thereby from the filter bag drops by gravity into a pan or the like positioned below the brushes.

Other objects, advantages and features of the invention will become apparent upon making reference to the specification to follow and the drawings illustrating a preferred form of the invention.

In the drawings:

Fig. 2 is a front view of the dust collector taken along section line 2—2 in Fig. 1;

Fig. 3 is a plan view through the dust collector taken along the line 3—3 in Fig. 1;

Fig. 4 is an enlarged fragmentary view showing the details of the filter bag assembly, taken along section line 4—4 in Fig. 3;

Fig. 5 is a fragmentary top view of a portion of the filter bag assembly;

Fig. 6 is an enlarged horizontal fragmentary sectional view of the filter bag assembly, taken along section line 6—6 in Fig. 1;

Fig. 7 is a fragmentary view of the air scoop in association with the hood of a grinding wheel;

Fig. 8 is a perspective view of one of the filter bags;

Fig. 9 is a fragmentary perspective view of the rigid metal frame located within the filter bag covering;

Fig. 10 is a transverse section of the filter bag of Fig. 8;

Fig. 11 is an enlarged view of the brush assembly used with the filter bag shown in Fig. 7; and Fig. 12 is an enlarged fragmentary perspective view of one of the filter bag spacers.

Reference should now be had to the drawings where like reference numerals indicate similar elements throughout.

Figure 1:
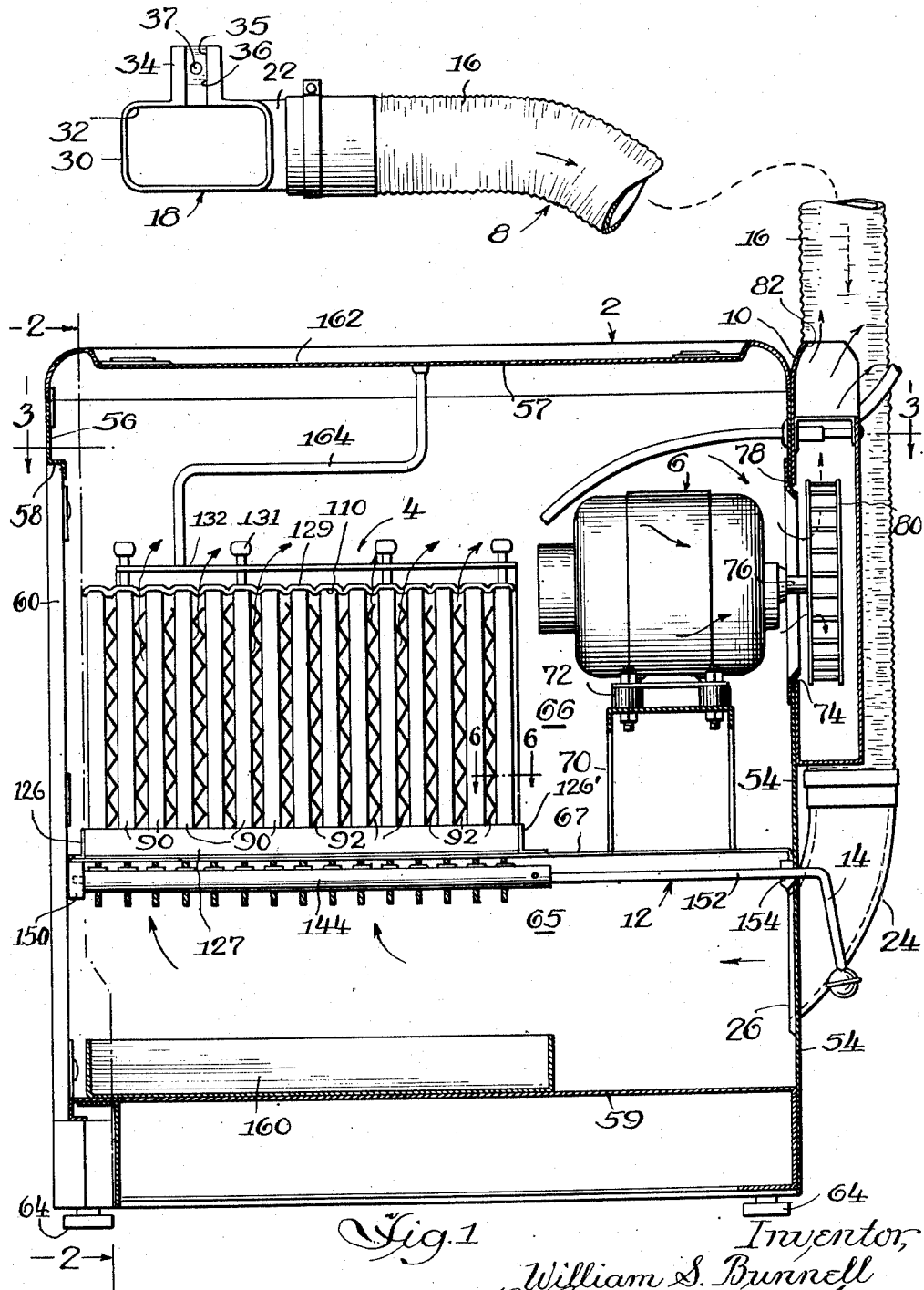
Fig. 1 is a side view through the dust collector of the present invention with one of the side panels of the cabinet omitted to show the interior thereof.

Briefly, the main components making up the dust collector of the present invention include a cabinet 2 housing a filter bag assembly 4 and a blower motor 6 which draws dust-laden air through an inlet duct assembly 8. The dust-laden air is carried through the filter bag assembly 4 where the dust is filtered out of the air. The dust-free air is then directed out of the housing through a discharge duct 10 over a path which includes the motor 6 so that the air current is also utilized to cool the motor. A filter bag cleaning assembly 12 is associated with the filter bag assembly 4 so that the bag assembly may be readily cleaned by the operation of a handle 14 accessible at the rear of the dust collecting device.

The intake duct assembly 8 includes a flexible accordion-type duct 16 which is connected at its inlet end with an air scoop 18. The flexible duct 16 is joined at the other end to a rigid duct section 24 which communicates with the bottom of the housing 2 through an inlet opening 26.

The front end 30 of the scoop 18 includes a generally rectangular inlet opening 32 which communicates with the chamber within the duct 16 through a hollow neck portion 22 of the scoop. Extending upwardly from the front portion 30 of the air scoop is a mounting block 34 having a vertically extending T-shaped slide channel 35 with the neck 36 thereof opening onto the front face of the mounting block. A horizontal threaded bore 37 extends through the block and communicates with the rear of the slot 35. A screw 38 is threadedly received in the bore 37. A slide bracket 40 is secured to a connecting lug 43 which projects from a hood 44 surrounding a grinding wheel 46, or other dust-producing device. The slide bracket 40 has a vertically extending, T-shaped track 47 which is complementary to the T-shaped channel 35 of the air scoop mounting block 34. The track 47 slidably receives the air scoop 18 thereon, which scoop may be frictionally locked into any number of vertical positions by tightening the screw 38. The scoop may then be placed in the most efficient dust-collecting position when in use and it can also be moved upward into a position where the scoop will not interfere with certain preliminary operations which may be performed on the grinding machine.

The cabinet 2 includes a pair of rectangular side panels 50 and 52, a rear panel 54, a front panel 56, a top panel 57, and a raised bottom panel 59. The front panel 56 has a large rectangular opening 58 therein which receives a removable door panel 60 which allows access to the inside of the cabinet 2 for servicing or installing the component parts contained therein. The removable panel 60 is secured in place by screws 62 which are threaded into apertured bosses 63 which are secured by brackets to the front panel 56. Casters 64 are provided on the cabinet bottom to facilitate the moving of the cabinet.

The cabinet is divided into lower and upper compartments 65 and 66, respectively, by means of a horizontal partition 67 joined to the front, rear and side walls of the cabinet. The partition 67 and the walls of the cabinet define a continuous passageway or conduit for the flow of dust-laden air through the dust collector. The partition 67 includes a large rectangular opening 68 on the surrounding rim of which is supported the filter bag assembly 4.

The inlet 26, which connects with the intake duct assembly 8, opens into the bottom compartment 65. The dust-laden air carried into the bottom compartment 65 through the inlet opening 26 enters the filter bag assembly 4 through the partition aperture 68. Dust-free air which emerges from the filter bag assembly 4 is discharged into the upper compartment 66.

The blower motor 6 is supported on the top of the partition 67 by a raised platform 70 carrying vibration-free mountings 72. The blower-motor shaft 76 extends through an opening 74 in the rear panel 54 and carries a blower wheel 80 located in the discharge duct 10. An annular baffle 78 secured to the periphery of the rear cabinet panel opening 74 directs the air into the path of the rotating blower wheel 80. The discharge duct 10 has an opening 82 in the top portion thereof through which the dust-free air is blown out of the cabinet 2.

The filter bag assembly 4 includes a plurality of open bottomed, flexible, air pervious filter bags 90 which are maintained in spaced relationship by corrugated spacers 92. The open bottoms 94 of the filter bags 90 overlap the longitudinal sides of the partition opening 68. The spaces between the bottom ends of the filter bags 90 are closed by abutting strips of felt 96 secured to the opposed sides of the filter bags near the bag openings. The strips project laterally beyond the extremities of the bag side walls and overlap the longitudinal sides of the partition openings 68. The bottom edges of the felt strips 96 extend to the bottom face of a rim 112 of the filter bags along their entire lengths, and act as barriers to the flow of dust-laden air between the bottoms of adjacent filter bags 90 and ensure the flow of all of the dust-laden air through the respective filter bags.

Each bag (Fig. 8) includes a flexible sateen fabric covering 102 which is air pervious and dust impervious. A frame assembly 105 is located within the covering 102 and tensions the bag covering to provide a full-bodied filter bag. The strips of felt 96 are cemented to the lower portions of the longitudinal walls of the bag covering and to the edges of the bag rim 112 so that the strips are flush with the bottom faces of the rim along their entire lengths. The bag covering 102 may be constructed from a single sheet of sateen fabric which has been folded and seamed along two opposite edges, as indicated at 104. The bag covering has closely spaced rectangular side walls 105, narrow end walls 108 and a narrow top wall 109. The fabric covering 102 is suitably treated, as by zinc chloride treatment, to render the bag flame-proof.

The frame assembly 105 is constructed in a manner to obstructe a minimum amount of area of the fabric making up the covering 102, so that a maximum amount of exposed inner bag surface is available for dust filtering purposes. The frame assembly 105 is comprised of a channel member 110 bent into a U-shape, and a rim member 112 which is secured to the open ends of the U-shaped channel member 110 as by spot welding indicated at 113. The flanges 114 and 117 of the channel join the web 116 thereof along smooth curves. The channel 110 is of a width approximating the width of the top wall 108 and the side walls 109 of the bag covering 102 and determines the internal contour of the bag covering.

The rim 112 of the frame assembly forms and elongated rim of metal which follows the contour of the open bottom of the bag covering 102. The rim has vertically extending side walls 118 which have inwardly turned flanges 118' at their upper ends and outwardly turned flanges 119 at their bottom ends. A pair of longitudinally spaced reenforcing ribs 120 extend between the upper flanges 118', which flanges are otherwise unconnected to provide three elongated entryways 121 into the filter bag. The flanges 118' are cut away at 122 so that the ends of the U-shaped channel member 110 may abut the inner faces of the side wall 118. The outwardly turned flanges 119 of the rim are joined at their ends by flat ears 123 which provide an extended surface for seating the bag in an upright position.

The bottom ends of the fabric covering 102 closely envelop the vertically extending side walls 118 of the rim 112 and are fixedly secured thereto as by gluing.

The manner in which the filter bag assembly is mounted in the dust collector cabinet will now be described. The outer portions of the rims 112 of the filter bags rest on resilient rubber strips 124 which extend along the longitudinal top edges of the opening 68. The resilient strips act as noise-deadening surfaces by providing a cushion and air seal for the edges of the filter bags. The felt strips 96 of the outermost filter bags of the assembly abut the inner faces of the upstanding walls of a pair of angle metal strip members 126 and 126'. The members 126 and 126' extend transversely of the cabinet and are secured to the partition 67. The ends of the rim ears 123 of the filter bags abut the upstanding walls of a pair of angle metal strip members 128 and 128', which extend longitudinally of the cabinet 2 and which are secured to the partition 67. The individual filter bags of the assembly 4 are thereby contained within a rectangular space above the partition aperture 68.

To maintain the separation of the flexible side walls 106 of the filter bags, the spacing members 92 are provided. The spacing members 92 each comprises a corrugated, wire mesh screen. The depth of the spacer screens approximate the desired distance between the side walls of adjacent bags. The outer faces of the corrugated screen abut the outer faces of the confronting side walls 106 of adjacent bags to maintain them in spaced relation. The screens may be made of galvanized iron which has been rubber coated to prevent the screens from scoring the fabric coverings of the filter bags.

There is thus provided a filter bag assembly into the open bottoms of which dust-laden air is drawn by the blower motor 6. The walls of each filter bag covering tend to expand under the pressure differential of the region on opposite sides of its walls and the filter bag frame assemblies 105 maintain the shapes of the bags. The corrugated screens 92 keep the side walls of adjacent bags apart and provide air-discharge spaces between the bags through which filtered air passes. As may be seen from Fig. 12, the screen 92 includes vertically extending wires each of which is corrugated or zigzagged and, between those wires, there are straight horizontal wires, the straight wires each lying in the crotches of the corrugated wires. As may be seen from Fig. 6, the corrugated wires engage opposite outer walls of the filter bag in each at the point or spot comprising the crotch of the corrugated wire. Because of the construction of the filter bags and spacing members 92, substantially all of the side walls 106 of the filter bag coverings are available for dust filtering purposes.

The filter bags are securely held in an upright position by spaced corrugated clamping strips 129—129'. The clamping strips include spaced channels 130 the walls of which envelop the upper ends of the filter bags 90. The clamping strips are pressed downward on top of the filter bags by screws 131 and 131' threaded, respectively, within apertures provided in bracket plates 132 and 132'. The bracket plate 132 is secured to the side wall 52 of the cabinet 2 and bracket plate 132' is supported on the partition 67 by means of a bracket 134. The bracket 134 includes a vertically extending portion 136 and spaced bracing members 138—138' which are secured to the partition 67.

The bag cleaning assembly 12 includes a number of vertically extending cylindrical brushes 140, one for each bag. Each brush extends into a filter bag. Each of the brushes has a shank 142 which projects through the central opening 121 in the associated filter bag 90. Each brush shank freely protrudes through a hole 143 in a cylindrical control rod 144 that extends transversely across the bag assembly below the open ends of the bags. Seating disks 146 are fixed on the brush shanks and rest on the control rod 144. The front end of the control rod 144 is rotatably supported in a bearing 150 adjacent to the front cabinet panel 56. The rod is secured at the other end to a rod 152 of reduced diameter which is journalled in a bearing 154 adjacent to the rear cabinet panel 54 and extends through the rear cabinet panel 54 and terminates in the laterally extending control handle 14. Oscillation of the control handle 14 rocks the control rod 144 which in turn moves the brushes 140 back and forth within the filter bags.

Each brush 140 engages the opposite side walls of the associated filter bag and, upon being moved by the rod 14, sweeps across most of the inner bag surfaces to remove accumulated dust on the walls of the filter bag, which drops into a bin 160 that rests on the top of the bottom panel 59 of the cabinet 2 just beneath the filter bag assembly 4 in the lower compartment 65.

The central portion of the top panel 57 of the cabinet 2 is depressed downwardly to form a trough 162 which catches oil or other liquids dropping from the grinding machine. A pipe 164 communicates with the trough 162 to drain the liquids accumulating thereon into a can 166 which is supported on the cabinet partition 67.

It should be understood that numerous modifications may be made of the preferred embodiment of the invention above described without deviating from the broader, generic aspects of the invention.

I claim:

1. A dust collector having means for drawing dust away from a dust filled region through a duct, a housing having a partition dividing the housing into a lower dust inlet compartment and an upper filtered air outlet compartment, an opening in said partition, walls extending upward from said partition and spaced a small distance outwardly of and extending parallel to opposite edges of said partition opening, strips of noise-deadening material on said partition extending along the facing sides of said upstanding walls, a filter bag assembly supported on said partition between said upstanding walls and comprising a number of individual open bottom filter bags in side by side relation and overlying said partition opening, said bags each having a pair of flat, upstanding, parallel, dust-filtering side walls which are parallel to the walls of the adjacent bags, mounting ears secured to the opposite bottom ends of the bags and resting on said strips of noise-deadening material, strips of flexible, air impervious material sealed to the sides of the bags adjacent the open ends thereof and extending across said partition opening, and abutting the strip of the adjacent bags to prevent entry of air between the bags at the partition opening, means for holding said filter bag assembly securely in an upright position comprising a pair of spaced corrugated clamping strips seated on the tops of said bags, the corrugations thereof extending between adjacent bags, clamping means for pressing downward against the top of said clamping strips to hold the subjacent filter bags in place, spacer means between adjacent bags for preventing contact of the dust-filtering side walls of adjacent bags, brushes within said bags and having shanks depending from the open bottoms of said bags and secured to a rock shaft mounted beneath said partition which shaft extends transversely across the filter bags, and means for rocking said shaft to move the brushes simultaneously within said bags to loosen the dust accumulating on the walls thereof, and means beneath said partition opening for collecting the loosened dust falling therethrough.

2. A dust collector having means for drawing dust away from a dust filled region through a duct, a housing having a partition dividing the housing into a lower dust inlet compartment and an upper filtered air outlet compartment, an opening in said partition, walls extending upward from said partition and spaced a small distance outwardly of and extending parallel to opposite edges of said partition opening, strips of noise-deadening material on said partition extending along the facing sides of said upstanding walls, a filter bag assembly supported on said partition between said upstanding walls and comprising a number of individual open bottom filter bags in side by side relation and overlying said partition opening, said bags each having a pair of flat, upstanding, parallel, dust-filtering side walls which are parallel to the walls of the adjacent bags, mounting ears secured to the opposite bottom ends of the bags and resting on said strips of noise-deadening material, strips of flexible, air impervious material sealed to the sides of the bags adjacent the open ends thereof and extending across said partition opening, and abutting the strip of the adjacent bags to prevent entry of air between the bags at the partition opening, means for holding said filter bag assembly securely in an upright position, spacer means between adjacent bags for preventing contact of the dust-filtering side walls of adjacent bags, brushes within said bags and having shanks depending from the open bottoms of said bags and secured to a rock shaft mounted beneath said partition which shaft extends transversely across the filter bags, and means for rocking said shaft to move the brushes simultaneously within said bags to loosen the dust accumulating on the walls thereof, and means beneath said partition opening for collecting the loosened dust falling therethrough.

3. A dust collector having means for drawing dust away from a dust filled region through a duct, a housing having a partition dividing the housing into a lower dust inlet compartment and an upper filtered air outlet compartment, an opening in said partition, strips of noise-deadening material on said partition extending along opposite sides of said opening, a filter bag assembly supported on said partition and comprising a number of individual open bottom filter bags in side by side relation and overlying said partition opening, said bags each having a pair of flat, upstanding, parallel, dust-filtering side walls which are parallel to the walls of the adjacent bags, the bags resting on said strips of noise-deadening material, means for sealing off the spaces between said bags adjacent to the bottoms thereof, means for holding said filter bag assembly securely in an upright position, brushes within said bag and having shanks depending from the open bottoms of said bags and secured to a rock shaft mounted beneath said partition, the shaft extending transversely across the filter bags, and means for rocking said shaft to move the brushes simultaneously within said bags to loosen dust accumulating on the walls thereof, and means beneath said partition opening for collecting the loosened dust falling therethrough.

References Cited in the file of this patent

UNITED STATES PATENTS

| | | |
|---|---|---|
| 385,899 | Allfree | July 10, 1888 |
| 531,414 | Gent | Dec. 25, 1894 |
| 1,402,294 | Hext | Jan. 3, 1922 |
| 1,617,073 | Matlock | Feb. 8, 1927 |
| 1,818,736 | Moore | Aug. 11, 1931 |
| 2,008,751 | Davies | July 23, 1935 |
| 2,020,120 | Leathers | Nov. 5, 1935 |
| 2,216,249 | Nelson | Oct. 1, 1940 |
| 2,252,724 | Myers | Aug. 19, 1941 |
| 2,695,681 | Boesger | Nov. 30, 1954 |

FOREIGN PATENTS

| | | |
|---|---|---|
| 106,507 | Sweden | Feb. 9, 1943 |
| 114,012 | Germany | Oct. 10, 1900 |
| 414,035 | Great Britain | July 20, 1934 |
| 473,549 | Germany | Mar. 16, 1929 |
| 583,445 | Great Britain | Dec. 18, 1946 |
| 855,800 | Germany | Nov. 17, 1952 |
| 856,275 | France | Mar. 18, 1940 |